United States Patent [19]

Johnson et al.

[11] Patent Number: 4,658,142

[45] Date of Patent: Apr. 14, 1987

[54] APPARATUS FOR DETECTING RADIATION IN A CONTAINER

[75] Inventors: Alfred N. Johnson, Voorhees; Anthony J. Prisco, Beverly, both of N.J.

[73] Assignee: Westinghouse Electric Corp., Pittsburgh, Pa.

[21] Appl. No.: 648,778

[22] Filed: Sep. 10, 1984

[51] Int. Cl.⁴ .......................... G21F 3/00; G01T 1/167
[52] U.S. Cl. ................................ 250/393; 250/360.1; 250/394; 250/515.1; 250/336.1
[58] Field of Search .................. 250/336.1, 255, 359.1, 250/515.1, 328, 393, 394, 363 R, 363 S, 505.1, 360.1; 378/69; 209/576, 589

[56] References Cited

U.S. PATENT DOCUMENTS

| 2,783,386 | 2/1957 | Mandeville et al. | 250/71 |
| 3,233,102 | 2/1966 | Packard | 250/363 S |
| 3,431,413 | 3/1969 | Anderson et al. | 250/363 S |
| 3,493,749 | 2/1970 | Olson | 250/364 |
| 3,683,181 | 8/1972 | Packin et al. | 378/69 |
| 3,796,875 | 3/1974 | Michaelis | 250/363 |
| 3,796,876 | 3/1974 | Krinninger | 250/363 |
| 3,832,545 | 8/1974 | Bartko | 250/312 |
| 3,883,741 | 5/1975 | Thumim | 250/325 |
| 3,950,646 | 4/1976 | Whitlock | 250/361 |
| 3,982,134 | 9/1976 | Householder et al. | 250/506 |
| 4,210,811 | 7/1980 | Dennhoven et al. | 250/358.1 |
| 4,267,446 | 5/1981 | Brown et al. | 250/255 |
| 4,275,298 | 6/1981 | Wykes et al. | 250/255 |
| 4,434,365 | 2/1984 | Bohme et al. | 250/255 |

FOREIGN PATENT DOCUMENTS 670575 9/1963 Canada .............................. 250/328

Primary Examiner—Carolyn E. Fields
Attorney, Agent, or Firm—L. A. DePaul

[57] ABSTRACT

A method for detecting radiation emanating from a container comprising the steps of providing shields which define a sector from which radiation can be detected. A sample from which radiation is believed to be emanating is placed in the sector so that radiation emanating from it can strike the detector. The shielding prevents background radiation from striking the detector. Also claimed is an apparatus for detecting radiation emanating from a sample comprising first and second shields and a detector. The shields define a sector from which the detector can detect radiation. Means for supporting the sample is disposed in the sector.

14 Claims, 4 Drawing Figures

U.S. Patent  Apr. 14, 1987  4,658,142
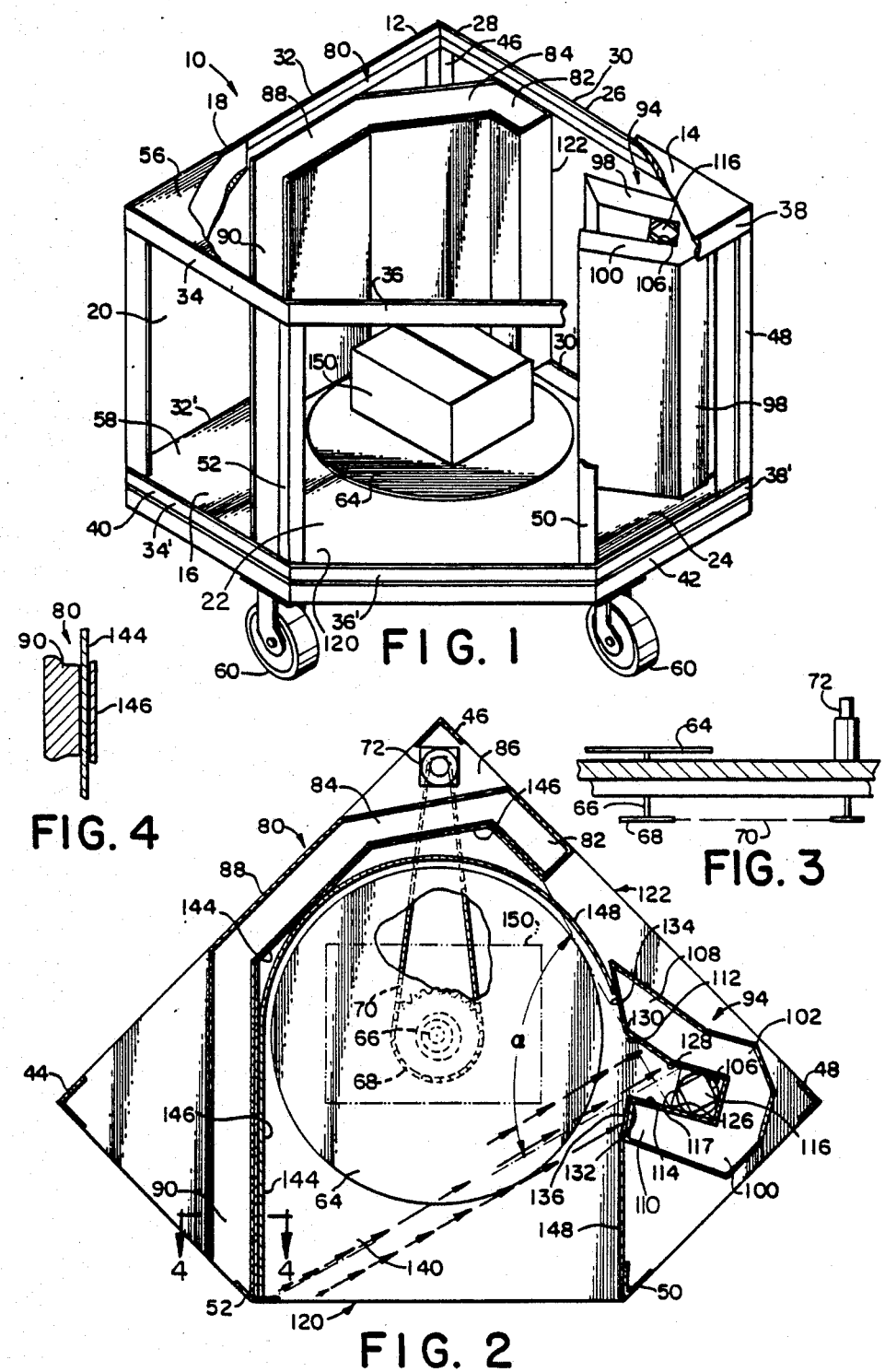

APPARATUS FOR DETECTING RADIATION IN A CONTAINER

SUMMARY OF THE INVENTION

This invention relates to an apparatus for detecting the emission of radiation from a sample.

The apparatus comprises a frame. Means are mounted on the frame for supporting the sample and for detecting radiation. Means are also mounted on the frame for shielding the radiation detecting means from background radiation.

BACKGROUND OF THE INVENTION

This invention relates to an apparatus for detecting the emission of radiation from a sample having a low level of radioactivity and more particularly to an apparatus which is inexpensive and efficient.

Waste having low levels of radiation is created at nuclear power plants and the like. Typically, the waste comprises paper, fabrics, boots, clothing, tools and various other items which can normally be expected to be used in the laboratories, offices, workshops and the like of a nuclear facility. Prior to its disposal the waste is collected in containers and is taken through a series of inspections during which it is inspected for beta particle and gamma ray emissions.

To the extent that radioactive emissions above predetermined levels are detected, the waste-filled containers are disposed of as hazardous by being buried at controlled disposal sites. The contents of the container are not subjected to further inspection due to the low likelihood of finding uncontaminated articles. Usually radiation in excess of two milliroentgens per hour from the container is considered to be the point above which there is a low likelihood of finding salvagable material.

Waste which exhibits radiation which is less than two milliroentgens per hour is subjected to closer inspection in an attempt to remove its nonradioactive components. This reduces the volume of material that must be buried at controlled sites and provides an opportunity to recover valuable items such as tools.

An aspect of inspecting waste relates to an inspection for low level gamma ray emission. To accomplish this inspection, waste which is generally considered to be relatively free from gamma radiation is placed in plastic bags or cardboard boxes. The waste may be compacted if desired prior to its inspection to increase the quantity of material being examined.

A process for the preliminary examination of the waste of which the apparatus disclosed herein can be a part is disclosed in co-pending patent application Ser. No. 648,780 enittled METHOD FOR SORTING RADIOACTIVE WASTE which was filed by Alfred N. Johnson and Anthony J. Prisco on Sept. 10, 1984.

The method apparatus disclosed herein is operative to detect the gamma radiation emanating from a sample while minimizing interference from background radiation. This is accomplished by locating shielding around the gamma ray detector and around the apparatus

BRIEF DESCRIPTION OF THE DRAWINGS

FIG. 1 is a perspective view partially broken away of an apparatus constructed in accordance with the presently preferred form of the invention.

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 3.

DETAILED DESCRIPTION OF THE PREFERRED EMBODIMENT

The apparatus 10 comprises a frame 12 which defines a roof 14, a floor 16 and a plurality of sides 18, 20, 22, 24 and 26.

Roof 14 is defined by a frame 28 which comprises a plurality of horizontal disposed members such as angle brackets 30, 32, 34, 36 and 38 which are assembled in end to end relation. The angle brackets support a lattice of other brackets (not shown) to support the roof shield as more fully explained herein. The roof 14 is generally rectangular except to the extent that bracket 36 truncates a corner.

The floor 16 is defined by a frame 40 comprising a plurality of horizontally disposed members such as angle brackets 30', 32', 34', 36' and 38' which are assembled in end to end relation. Frame 40 may be mounted on a supporting base 42.

The upper and lower frames 28 and 40 and the supporting base 42 have the same shape. The lower frame 40 is held in spaced relation from the upper frame 12 by a plurality of vertically extending brackets 44, 46, 48, 50 and 52 which are connected to the respective frames at the juncture of the horizontally disposed members 30, 32, 34, 36 and 38 and 30', 32', 34', 36' and 38'.

Both the roof 14 and floor 16 are defined by layers 56 and 58 of lead shielding which is disposed within the upper and lower frames 28 and 40. The roof shielding 56 is supported by the aforementioned lattice comprising frame 28 while the floor shielding 58 is supported by frame 40 and support base 42. Preferably, the shielding is about four inches in thickness. This thickness is considered to be adequate to attenuate gamma rays to an appropriate level.

The support base 42 may be supported by a plurality of casters 60 so that the apparatus 10 can be moved from place to place as considered necessary.

A generally circular platform 64 is rotatably supported in the floor 16 for rotation about a vertical axis 66 defined by a vertical shaft. Suitable means may be provided for rotating the circular platform 64. One presently preferred means comprises a horizontally disposed sprocket 68 fixed to shaft 66 for movement therewith and a sprocket chain 70 in engagement with the sprocket 68. Power for driving sprocket chain 70 can come from a suitable electric motor 72 which may be mounted on floor 16 adjacent bracket 46.

A first shield 80 which may be comprised of lead is placed around a portion of the periphery of the platform 64. Shield 80 extends between the roof 14 and floor 16. It is preferably about four inches thick.

The shield 80 may be a unitary element, or it may be comprised of a plurality of sections as shown. A first relatively narrow section 82 may be along side 26. At one edge it is connected to a second section 84 which is somewhat wider than section 82 and which is disposed at an angle thereto. Section 84 may truncate the corner 86 (FIG. 2) so that the motor 72 lies outside the shield. A third section 88 lies alongside 18. It is connected at one edge to section 84. Its other edge is connected to section 90.

A second shield 94 is disposed oppositely of shield 80. It is generally u-shaped in that it includes opposed facing shield section 98 and 100 which are connected by a third section 102. The sections 98, 100 and 102 define a recess 106 which is in generally facing relation to the circular platform 64 and the first shield 80. The distal end 108 of facing section 98 diverges from section 100 so that its inner surface 112 is disposed at an angle relative to the inner surface 114 of facing section 100.

A suitable gamma ray detector 116 is mounted on the second shield 94. Preferably, it is located in the recess 106 defined by facing sections 98 and 100. It is arranged vertically in an elongated array which is in generally parallel relation to the axis of rotation of the platform 64 and with its face 117 disposed at about a right angle to a radius extending from the axis of rotation 66. Preferably, the detector 116 is a sodium iodide scintillation detector of a type which is well known for detecting gamma radiation. The recess 106 can be lined with a suitable yieldable material such as cork so that the detector 116 can be frictionally and removably supported between the facing sections.

A first access opening 120 is provided in the side of the apparatus between shield section 90 and vertical bracket 50. The access opening 120 is at least as large as the diameter of the circular platform 64 to permit the easy placement of containers on the platform and their removal after they are examined for gamma radiation. A second access opening 122 is provided between shield section 82 and the distal end 108 of shield section 98. This access opening permits inspection of the item being examined if desired and, if the items are small enough they can be placed on the platform 64 or removed therethrough.

The gamma ray detector 116 can detect gamma radiation across its entire face 117. Therefore, the sector in which it can directly detect gamma radiation is defined by straight lines extending between the corners 126 and 128 of the detector 116 and the corners 130 and 132 defined by the juncture of inner surfaces 112 and 114 and their respective ends 134 and 136 of the opposite legs 108 and 110 of the shield 94. The included angle α defined thereby is about 67°. It extends from near the end of shield section 90 adjacent access opening 120 to near the end of shield section 82 adjacent access opening 122. Preferably, the sides of the sector defined by angle α should be about an inch in from the responsive access openings to minimize the amount of unnecessary shielding.

The area defined by the angle α, shield 80 and shield 94 define a test zone 140. Because of the position of the shields, gamma radiation emanating from within the test zone can be directly detected by the detector 116. Gamma radiation originating from outside the test zone 140 will be attenuated by shield 80 or shield 94 thereby minimizing the effect that it will have on detector 116. This will maximize the ratio of sample to background radiation to enhance detection sensitivity.

The angle α is arranged so that it includes somewhat more than half of the facing surface of the sample on the platform 64. With this arrangement the surface of the sample passes through the test zone while the center of the sample is always in the test zone. Portions of the sample that lie intermediate the center and the surface will be in the test zone longer and shorter periods respectively. This is desirable because it is preferable to inspect the interior of the sample for a longer interval than the surface so that the detector response will be generally the same for a given quantity of gamma radiation with minimum regard to the distance of its source from the detector.

Shield 94 is arranged so that the portion of the angle defined by the inner surfaces of 106 and 114 of facing sections 98 and 100 include the axis of rotation 66 of the platform 64. Consequently, radiation emanating from that portion of the sample overlying the axis of rotation 66 will strike the detector at a right angle to its face 117. Because of this the radiation from the center of rotation will be detected at its maximum intensity.

The inner surfaces of both shields 80 and 94 and the floor and roof may be covered by a layer of copper 144 (FIG. 4) which may preferably be about a sixteenth of an inch thick. The inclusion of layer 144 is useful at low energy levels to control the emission of characteristic x-rays from the lead when it is struck by gamma rays. This is desirable because the low energy characteristic x-rays will be read as a low level gamma ray by the detector 116 thereby causing a false reading as to the level of intensity of low level gamma radiation present.

Accordingly, if there is no need or desire to examine low level gamma radiation, i.e, under about 250 KeV, the copper layer can be omitted.

A removable sheet of steel is provided as a liner for the apparatus 10. The sheet comprises a first portion 146 which extends around substantially the entire periphery of the platform 64. It extends from the end 134 of distal end 108 to bracket 52 thereby completely overlying shield 80. The second liner portion 148 extends from the end 136 of shield section 100 to vertical bracket 50. The liner portions 146 and 148 can be made readily removable from the inner surface of shields 80 and 94 and the respective vertical brackets 50 and 52 by any suitable fasteners such as screws, snap fasteners, clamps, or the like.

The apparatus 10 which has just been describd can be used to detect gamma radiation which is emanating from a sample prior to its disposal.

It can also be used as a prescreening device in which containers of waste having low levels of radioactivity are given a preliminary examination to determine if they should be treated as hazardous waste. In the alternative, the device can be used as a final check to assure that to the extent that gamma radiation is being emitted from a container of radioactive waste the amount of such radiation is so low as not to present a radiologic hazard.

Referring now to the drawing, a container such as the cardboard box 150 is placed on the circular platform 64. In the alternative, the container may be made from a suitable thermoplastic such as polyethylene which is commercially available in the form of plastic trash bags. The motor 72 is energized and the platform begins to rotate. Preferably, the platform 64 rotates at about two revolutions per minute and it rotates for one revolution.

To the extent that there is gamma radiation emanating from the container 150, such radiation is directed randomly in all directions. Most of the radiation will be absorbed by the first and second shields 80 and 94 or the floor or roof shields 56 and 58. Some will be directed through openings 120 and 122. The remainder of the radiation will strike the distal ends of facing shield sections 98 and 100, or will directly strike the gamma ray detector 116 or will strike the gamma ray detector 116 after being scattered by the shields. The gamma ray detector 116 may be preset in a well-known manner to energize an alarm if radiation above a predetermined level is detected.

Because of the fact that the test zone 140 diverges at angle α, gamma rays that originate within the test zone and which are aimed directly at the detector 116 from the container or which are aimed at the detector from the gamma rays scattered by the shielding will primarily be detected.

It is impossible for background gamma radiation, which might enter the test zone 140 through the openings 120 and 122, to directly strike the detector 116 because those openings are located outside the test zone. Further, the ends of the test zone are closed by shields 80 and 94. Consequently, a true reading of the gamma radiation emanating from the container can be taken without providing expensive shielded closures for the openings 120 and 122.

Because of the likelihood that gamma ray generating waste is randomly located within the container 150, the platform 64 is rotated so that each portion of the container passes through the test zone 140 and is placed relatively close to the detector 116.

Further, it should be recalled by examining FIG. 2 that the portion of the sector defined by the angle between facing surfaces 106 and 114 includes the center of rotation 66. Consequently, even if the container is placed on the platform 64 in a random fashion, the portion of it overlying the axis of rotation (and probably blocked by other material in the container) will pass through the test zone at a right angle to the face 117 of the detector 116 and remain at a constant distance from the detector 116. The provision of having the axis of rotation lie at a right angle to the detector within the test zone 140 is a safety feature to assure that the entire container is uniformly sampled. Thus, if the axis of rotation was disposed entirely to one side of the portion of the sector defined by surfaces 106 and 114, that portion of the sample which was at the axis of rotation would move into and out of position so that a continuous reading of gamma radiation striking the detector 116 at a right angle from the center of the sample could not be achieved.

While it is possible to arrange the shields so that the edge of the sector defined by surfaces 106 and 114 passes through the axis of rotation, such an arrangement may result in undue risk since machine tolerances, the wearing of parts and the like may cause the sector to shift so that it does not include the axis of rotation. This would give rise to the danger that portions of the sample are not being inspected properly.

It is to be expected that over a period of time radioactive dust and particles which are on the surface of the boxes or containers 150 will be transferred to the interior walls of the shields 80 and 94. Consequently, it is possible that as the radiation builds up on those walls, detector 116 will indicate the presence of a hazardous level of gamma radiation notwithstanding the fact that the level of gamma radiation in the sample is well below that level. Consequently, it is necessary to decontaminate the interior walls of the apparatus from time to time. Such decontamination may take the form of merely brushing the contaminated particles from the walls, or if circumstances require, decontaminating them by more extensive procedures.

The decontamination of the interior walls of the apparatus is vastly simplified by the use of steel liner portions 146 and 148. Since these liner portions are readily removable, they can be removed in a simple and convenient manner for decontamination. While they are being decontaminated, substitute liner portions can be installed in the apparatus so that it can continue to be used.

What has been described is an apparatus for detecting gamma radiation in a sample of radioactive waste which may be in a container. The apparatus is arranged with the minimum amount of shielding consistent with being able to reduce the impingement of background radiation on the detector while the sample is being examined. Further, a means has been provided for assuring that the entire sample has an opportunity to be exposed to the detector.

Thus, while the invention has been described with respect to one form thereof, it is apparent that many other forms and embodiments would be obvious to those skilled in the art. Thus, the scope of the invention should not be limited by the foregoing description, but rather, only by the scope of the claims appended hereto.

We claim:

1. An apparatus for detecting the emission of radiation emanating from a sample while minimizing interference by background radiation comprising an enclosure, said enclosure comprising a floor and a roof, said floor and said roof being comprised of radiation shielding material, first and second radiation shielding sections, each of said shielding sections extending between said floor and said roof, one of said radiation shielding sections being generally "U" shaped and comprising first and second side walls connected by another wall, a platform for supporting a sample, means for supporting said platform between said first and second radiation shielding sections for rotation about a vertical axis of rotation, means for detecting radiation, said means for detecting being disposed in an elongated array which is disposed in parallel relation to said axis of rotation, said means for detecting being located between said first and second side walls and in generally facing relation to said second shielding section, and the facing surfaces of said first and second side walls diverge to define a sector from which said means for detecting detects radiation, said second radiation shielding section extending across said sector so that said first and second radiation shielding sections, said floor and said roof cooperate to shield said radiation detectors from background radiation, said first and second radiation shielding sections being spaced from each other to define at least one opening therebetween, said opening being between said floor and said roof and being located outside of said sector so that the amount of said radiation shielding around said sample is minimized, said opening being of sufficient size to allow said sample to be placed on and removed from said support means.

2. A device as defined in claim 1 including means for rotating said platform around said axis.

3. A device as defined in claim 2 wherein said means for rotating is operative to rotate said platform at least once.

4. A device as defined in claim 2 wherein said sector includes at least said axis of rotation of said platform.

5. A device as defined in claim 1 wherein said means for detecting radiation is operative to detect gamma rays.

6. An apparatus as defined in claim 1 including means for rotating said platform about said axis so at least a portion of said platform passes through said sector.

7. A device as defined in claim 6 wherein said axis of rotation of said platform lies in said sector.

8. An apparatus as defined in claim 1 wherein the included angle of said sector exposes at least about a half of the surface of the sample to said means for detecting radiation.

9. An apparatus as defined in claim 1 wherein the angle defined by said sector includes the midportion of said sample and about half of its surface facing said means for detecting radiation.

10. An apparatus as defined in claim 1 wherein said opening is as wide as the major dimension of said platform.

11. A device as defined in claim 1 wherein said radiation shielding sections are comprised of lead, and a layer of copper is disposed between said shielding sections and said platform at least over the portions of said shielding sections in said sector.

12. An apparatus as defined in claim 11 wherein said lead is at least about four inches thick and said copper is at least about a sixteenth of an inch thick.

13. An apparatus as defined in claim 1 including means defining a liner, said liner being disposed between said sections of radiation shielding and said platform, said liner comprising means for preventing radioactive material from being transferred from said sample to said sections of radiation shielding.

14. An apparatus as defined in claim 1 including wheel means mounted on said enclosure for enabling said apparatus to be moved.

* * * * *